W. TEETER.
MOUSE AND RAT TRAP.
APPLICATION FILED SEPT. 8, 1908. RENEWED FEB. 12, 1910.

973,583.  Patented Oct. 25, 1910.

Witnesses  
Oliver W. Holmes  
Rea P. Albright

Inventor  
William Teeter,  
By O'Meara & Broch  
Attorneys

THE NORRIS PETERS CO., WASHINGTON, D. C.

UNITED STATES PATENT OFFICE.

WILLIAM TEETER, OF NEWETT, COLORADO.

MOUSE AND RAT TRAP.

973,583.  Specification of Letters Patent.  Patented Oct. 25, 1910.

Application filed September 8, 1908, Serial No. 452,044. Renewed February 12, 1910. Serial No. 543,556.

*To all whom it may concern:*

Be it known that I, WILLIAM TEETER, a citizen of the United States, residing at Newett, in the county of Chaffee and State of Colorado, have invented a new and useful Improvement in Mouse and Rat Traps, of which the following is a specification.

This invention relates to animal traps and more particularly to what is known as an "everset" trap, the object being to provide a trap which is so constructed that the rat will be thrown into a vessel of water when it tries to reach the bait.

Another object of my invention is to provide a trap which is exceedingly simple and cheap in construction, the parts being so arranged that they can be readily taken apart for shipping.

A further object of the invention is to provide a trap which can be used on a box, table or a vessel, the inclined tilting platform being so mounted that it will be normally held in an inclined position so that the rats or mice can readily travel up the same, when enticed by the bait which is arranged at the end of the platform.

With these various objects in view, my invention consists in the novel features of construction and arrangement of parts hereinafter fully described, pointed out in the claim and shown in the accompanying drawings, in which—

Figure 1:
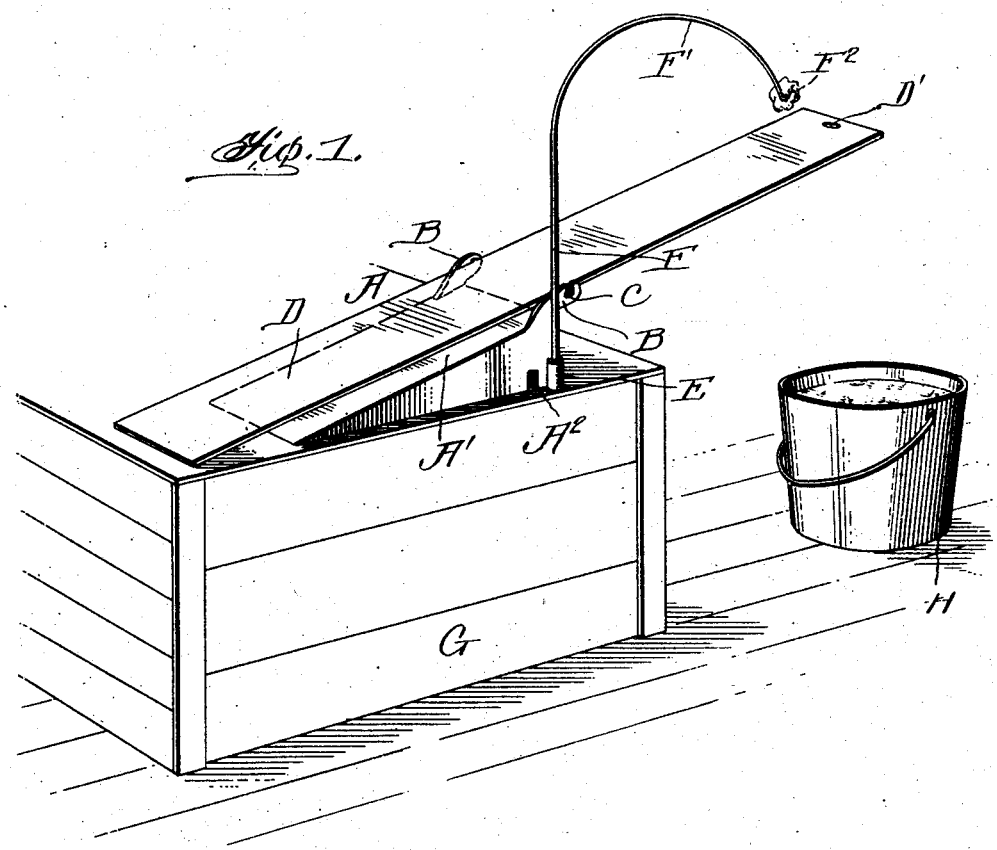
Figure 2:
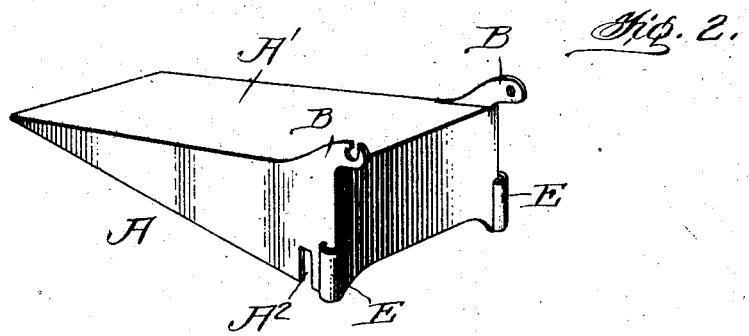

Figure 1 is a perspective view of my improved trap showing the application of the same. Fig. 2 is a perspective view of the base.

In carrying out my improved invention, I employ a base A provided with an inclined top A' having ears B at its upper end, one ear being provided with an opening and the other with a slot in which are adapted to fit the pivot pins C of a platform D which is normally held in an inclined position so that a rat can readily travel up the same, the end of the platform being provided with an opening D' in which bait can be secured for enticing the rat. Sockets E are formed on the sides of the base in one of which is adapted to be secured a rod F having a bowed end F' provided with a hook $F^2$ adapted to support a piece of bait, this rod being so arranged that the bait will be held slightly above the upper end of the platform D so that when the rat travels up the platform the weight of the rat will cause the platform to tilt and throw the rat into a suitable vessel of water arranged under the end. The base is provided with a notch $A^2$ adapted to fit over the edge of a vessel so that the trap can be used with tanks and the like.

In Fig. 1, I have shown my improved trap arranged on a box G and a bucket H arranged under the upper end of the tilting platform, but it is of course understood that the trap can be used on a table or any other piece of furniture and that any kind of vessel desired can be used. The bottom of the base is preferably formed concaved as clearly shown in Fig. 2 and the base is preferably formed of metal so that it will not be moved by the weight of a large rat.

From the foregoing description, it will be seen that I have provided a rat trap which is so constructed that the tilting platform will be normally held in an inclined position to allow the animal to travel easily up the same to reach the bait which is arranged at the end of the platform so that it will be impossible for the animal to get the bait without tilting the platform.

What I claim is:—

In a trap of the kind described, the combination with a base having an inclined top provided with upwardly projecting ears at its forward end, a platform provided with pivot pins detachably mounted in said ears, said base being provided with a notch adapted to fit over a vessel, sockets formed on the sides of said base, and a rod adapted to fit in one of said sockets provided with a bowed portion having a hook at its end for supporting a bait over the upper end of said platform.

WILLIAM TEETER.

Witnesses:
 WM. R. JENKINS,
 JOHN C. BAIRD.